United States Patent
Murakami

(10) Patent No.: US 9,855,811 B2
(45) Date of Patent: Jan. 2, 2018

(54) VEHICLE SUSPENSION SYSTEM

(71) Applicant: Showa Corporation, Gyoda-shi (JP)

(72) Inventor: Yosuke Murakami, Fukuroi (JP)

(73) Assignee: SHOWA CORPORATION, Gyoda-Shi (JP)

( * ) Notice: Subject to any disclaimer, the term of this patent is extended or adjusted under 35 U.S.C. 154(b) by 0 days.

(21) Appl. No.: 15/051,117

(22) Filed: Feb. 23, 2016

(65) Prior Publication Data

US 2016/0263958 A1 Sep. 15, 2016

(30) Foreign Application Priority Data

Mar. 12, 2015 (JP) .................................. 2015-048982

(51) Int. Cl.
| | |
|---|---|
| F16F 9/516 | (2006.01) |
| B60G 17/015 | (2006.01) |
| B60G 17/08 | (2006.01) |
| F16F 9/48 | (2006.01) |
| F16F 15/00 | (2006.01) |
| F16F 9/18 | (2006.01) |

(Continued)

(52) U.S. Cl.
CPC ....... *B60G 17/0152* (2013.01); *B60G 15/062* (2013.01); *B60G 17/08* (2013.01); *F16F 9/187* (2013.01); *F16F 9/48* (2013.01); *F16F 9/516* (2013.01); *F16F 15/002* (2013.01); *B60G 2202/31* (2013.01); *B60G 2206/41* (2013.01); *B60G 2300/12* (2013.01); *B60G 2400/252* (2013.01); *B60G 2500/10* (2013.01); *B60G 2500/11* (2013.01); *B60G 2600/182* (2013.01); *B62K 25/10* (2013.01)

(58) Field of Classification Search
CPC .... F16F 9/464; F16F 9/465; F16F 9/46; F16F 9/461; F16F 9/50; F16F 9/512; F16F 9/516; F16F 9/187

USPC ............. 188/282.4, 281, 266.5, 266.2, 266.1
See application file for complete search history.

(56) References Cited

U.S. PATENT DOCUMENTS

| | | | | |
|---|---|---|---|---|
| 4,655,440 | A | * | 4/1987 | Eckert ................ B60G 17/0152 188/266.5 |
| 4,730,816 | A | * | 3/1988 | Eckert ................ B60G 17/0152 267/64.11 |

(Continued)

FOREIGN PATENT DOCUMENTS

| | | |
|---|---|---|
| EP | 0544484 A | 6/1993 |
| JP | 2014-000843 A | 1/2014 |

OTHER PUBLICATIONS

Extended European Search Report dated Aug. 5, 2016 for the corresponding European Patent Application No. 16157284.7.

*Primary Examiner* — Thomas Irvin
(74) *Attorney, Agent, or Firm* — Leason Ellis LLP

(57) ABSTRACT

A vehicle suspension system includes a shock absorber having a cylinder in which a fluid is sealed, a piston slidably fitted into the cylinder, a piston rod connected to the piston and extending to an outside of the cylinder and a damping force generating apparatus controlling a flow of the fluid generated by a sliding motion of the piston inside the cylinder, a suspension spring, a detector detecting a stroke position of the piston rod with respect to the cylinder and a controller controlling the damping force generating apparatus so that one of an extension side damping force and a compression side damping force is increased and other of them is reduced in proportion to the stroke position detected by the detector.

6 Claims, 8 Drawing Sheets

(51) Int. Cl.
  *B60G 15/06* (2006.01)
  *B62K 25/10* (2006.01)

(56) References Cited

U.S. PATENT DOCUMENTS

| | | | | |
|---|---|---|---|---|
| 5,152,547 | A * | 10/1992 | Davis | B60G 17/018 188/313 |
| 5,413,196 | A * | 5/1995 | Forster | F16F 9/446 188/266.6 |
| 5,509,512 | A * | 4/1996 | Grundei | B60G 15/063 188/284 |
| 5,522,482 | A | 6/1996 | Kashiwagi et al. | |
| 5,533,597 | A | 7/1996 | Nezu et al. | |
| 5,781,873 | A * | 7/1998 | Sasaki | B60G 17/015 188/281 |
| 6,067,490 | A * | 5/2000 | Ichimaru | B60G 17/018 188/266.2 |
| 6,321,887 | B1 * | 11/2001 | Kurusu | B60G 17/018 188/266.2 |
| 7,448,479 | B2 * | 11/2008 | Fukuda | F16F 9/465 188/266.2 |
| 7,942,248 | B2 * | 5/2011 | St. Clair | B60N 2/501 188/267.1 |
| 9,446,649 | B2 * | 9/2016 | Kurita | B62K 25/04 |
| 9,506,521 | B2 * | 11/2016 | Yamazaki | F16F 9/512 |
| 2005/0098401 | A1 * | 5/2005 | Hamilton | B60G 17/0152 188/378 |
| 2008/0009992 | A1 | 1/2008 | Izawa et al. | |
| 2012/0305348 | A1 * | 12/2012 | Katayama | B60G 17/08 188/266.2 |
| 2013/0275003 | A1 * | 10/2013 | Uchino | B60G 17/06 701/40 |
| 2014/0084528 | A1 | 3/2014 | Murakami | |
| 2015/0276004 | A1 * | 10/2015 | Murakami | F16F 9/512 188/313 |
| 2016/0090146 | A1 * | 3/2016 | Murakami | B62K 25/28 188/266.2 |
| 2016/0091044 | A1 * | 3/2016 | Murakami | F16F 9/34 188/313 |
| 2016/0195152 | A1 * | 7/2016 | Mori | F16F 9/465 188/313 |

* cited by examiner

VEHICLE SUSPENSION SYSTEM

CROSS-REFERENCE TO RELATED APPLICATIONS

This application is based on and claims priority under 35 USC 119 from Japanese Patent Application No. 2015-048982 filed on Mar. 12, 2015 the entire content of which is incorporated herein by reference.

BACKGROUND

1. Technical Field

The present invention relates to a vehicle suspension system including a shock absorber having a damping force generating apparatus which generates a damping force by controlling the flow of a working fluid generated by a sliding motion of a piston inside the cylinder.

2. Related Art

As a shock absorber used as cushioning for a motor vehicle or a motorcycle, for example, there is known a variable attenuation damper (semi-active damper) including a cylinder in which oil is sealed as the working fluid, a piton slidably fitted into the cylinder, a piston rod connected to the piston and extending to an outside of the cylinder and a damping force generating apparatus which generates a damping force by controlling a flow of oil generated by sliding of the piston inside the cylinder. In such semi-active damper, the damping force is controlled by adjusting flow resistance of the oil at a valve body arranged in a flow path of working fluid by adjusting an opening degree of the valve body by using a solenoid actuator and the like.

It is also known that an active damper using a hydraulic pressure or an air pressure actuator, for example, controls the damping force, a spring constant and the like by Skyhook control and so on based on vertical acceleration and the like detected by a sensor such as an accelerometer (for example, see Japanese Patent Application Laid-open No. 2014-843).

The above active damper can produce thrust by itself, thereby controlling not only damping force components but also spring/reaction force components, that is, enabling various control. However, manufacturing costs of the active damper are high, the mechanism thereof is complicated, and the power consumption therein is high.

SUMMARY OF THE INVENTION

The present invention has been made in view of the above, and the object thereof is to provide a vehicle suspension system enabling increased freedom in control as compared with related art without incurring additional manufacturing costs, complication of the mechanism and additional power consumption.

According to an embodiment of the present invention, there is provided a vehicle suspension system including a shock absorber having a cylinder in which a fluid is sealed, a piston slidably fitted into the cylinder, a piston rod connected to the piston and extending to an outside of the cylinder and a damping force generating apparatus controlling a flow of the fluid generated by sliding motion of the piston inside the cylinder, a suspension spring, a detector detecting a stroke position of the piston rod with respect to the cylinder, and a controller controlling the damping force generating apparatus so that one of an extension side damping force and a compression side damping force is increased and other of the extension side damping force and the compression side damping force is reduced in proportion to the stroke position detected by the detector.

According to the present invention, it is possible to provide a vehicle suspension system enabling increased freedom in control as compared with related art without incurring additional manufacturing costs, complication of the mechanism and additional power consumption.

DESCRIPTION OF EMBODIMENTS

An exemplary embodiment of the present invention will be explained with reference to the drawings.

Figure 1:
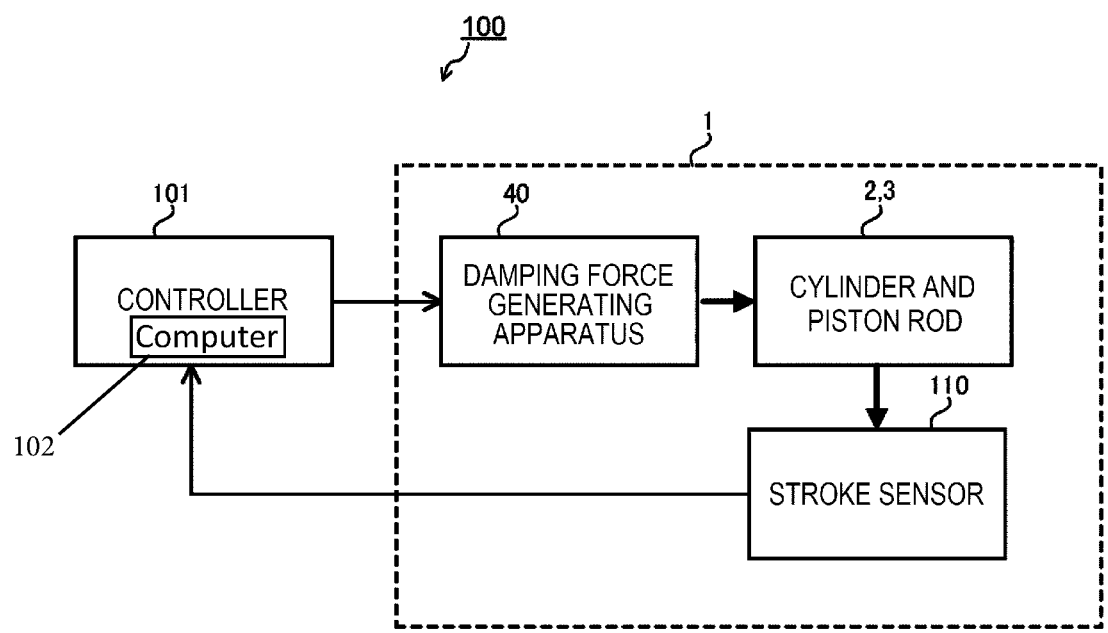
FIG. 1 is a block diagram showing an overview configuration of a vehicle suspension system according to an embodiment.

FIG. 1 is a block diagram showing a configuration of a vehicle suspension system 100 according to an embodiment. The vehicle suspension system 100 includes a shock absorber 1 and a controller 101. The shock absorber 1 includes a cylinder 2, a piston rod 3, a damping force generating apparatus 40 which generates a damping force by controlling a flow of working fluid (oil in the embodiment) filled in the cylinder 2, and a stroke sensor 110. The stroke sensor 110 detects a position of the piston rod 3 (stroke position) with respect to the cylinder 2.

The controller 101 controls the damping force generating apparatus 40 based on detection signal by the stroke sensor 110. Specifically, the controller 101 controls the damping force generating apparatus 40 so that one of an extension-side damping force and a compression-side damping force is increased and the other is reduced in proportion to the stroke position detected by the stroke sensor 110 as described later in detail.

(Structure of Shock Absorber)

Figure 2:
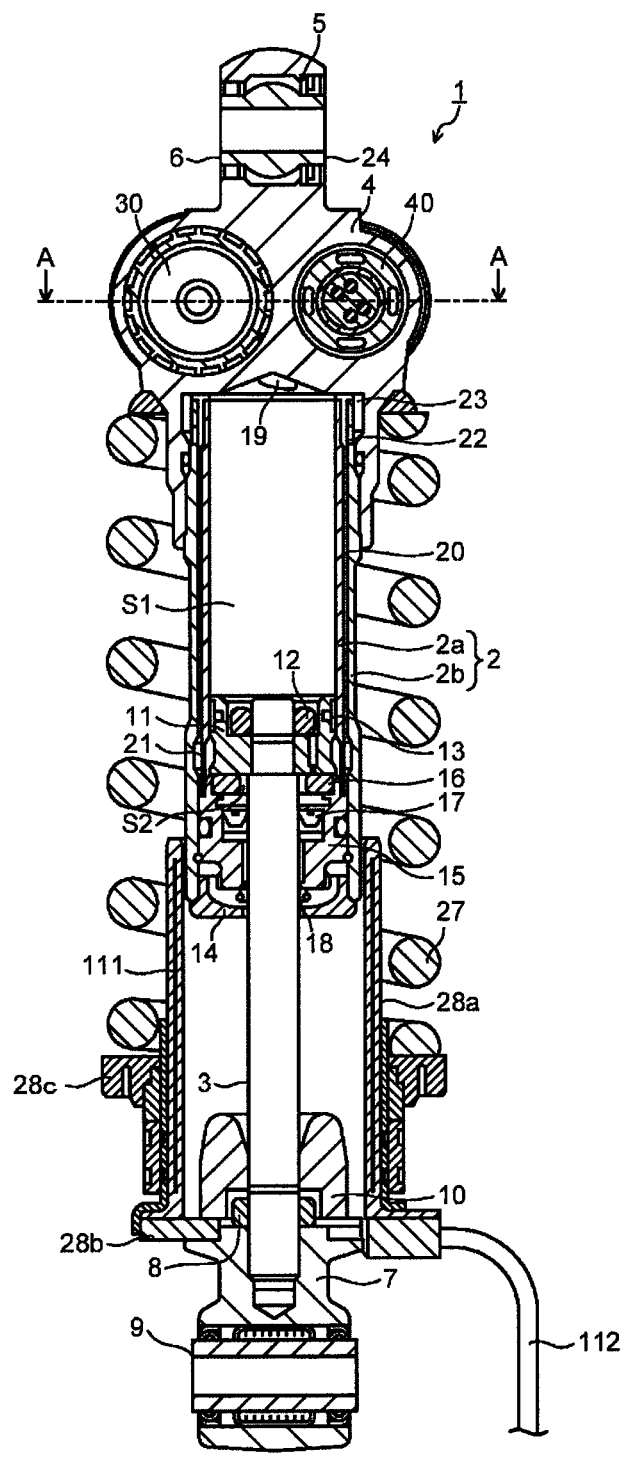
FIG. 2 is a vertical cross-sectional view of a shock absorber of the vehicle suspension system according to the embodiment.
Figure 3:
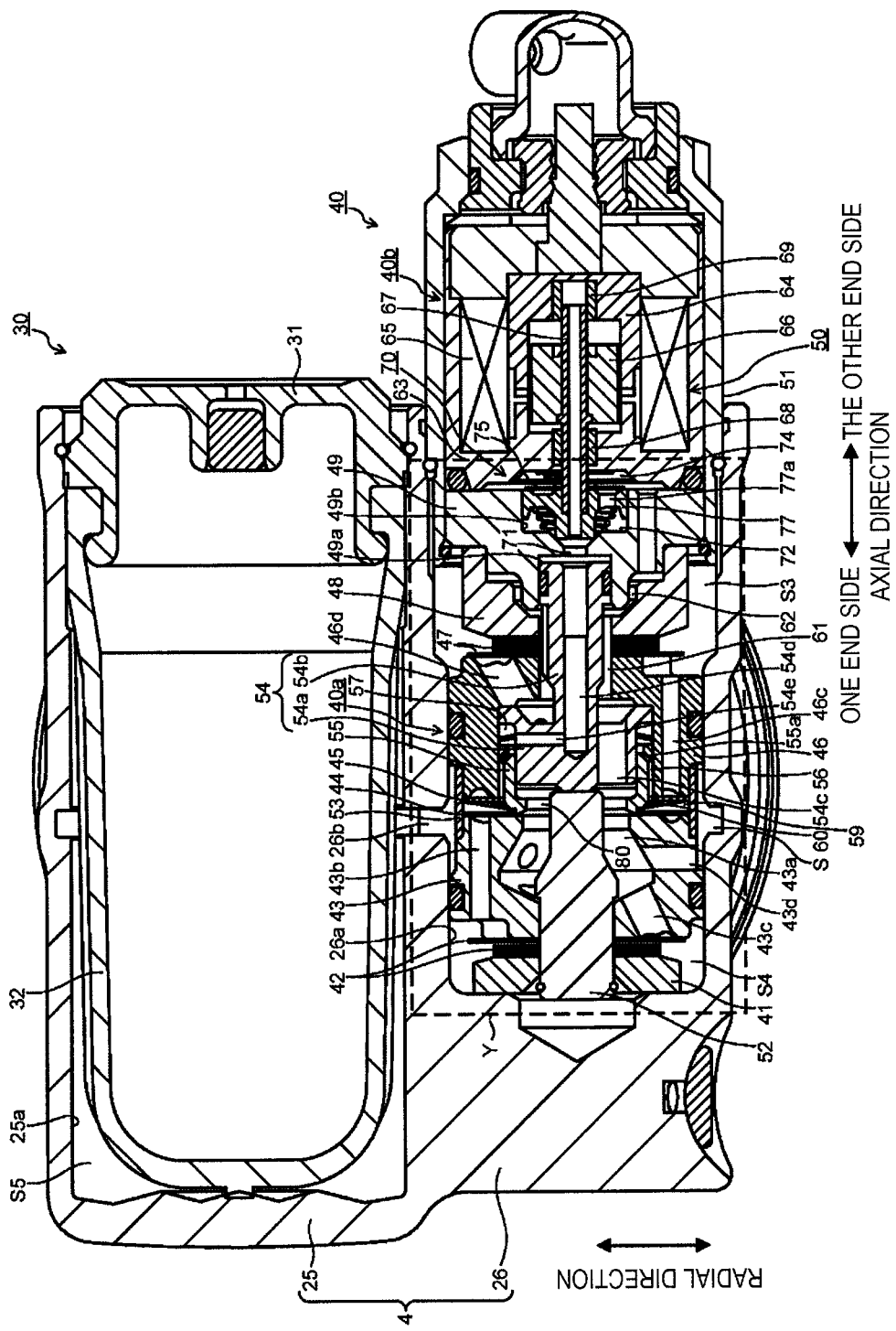
FIG. 3 is a cross-sectional view along A-A line of FIG. 2.
Figure 4:
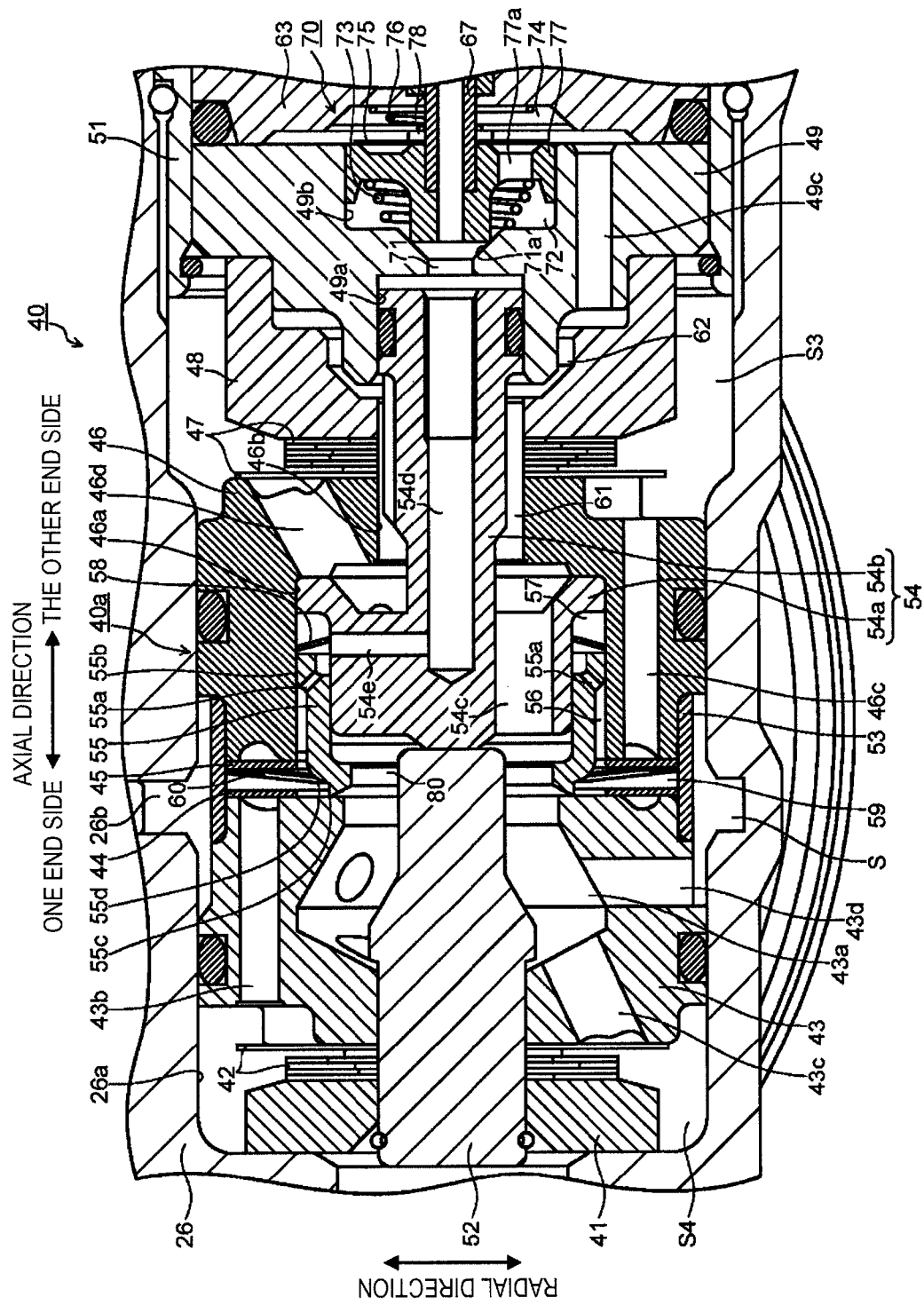
FIG. 4 is an enlarged detailed view of portion Y of FIG. 3.

First, structure of the shock absorber 1 according to the embodiment will be explained. FIG. 2 is a vertical cross-sectional view of the shock absorber according to the embodiment, FIG. 3 is a cross sectional view along A-A of FIG. 2, and FIG. 4 is an enlarged detailed view of a portion Y of FIG. 3.

The shock absorber 1 is an inverted-type rear cushion which suspends a rear wheel of a motorcycle with respect to a vehicle body. The shock absorber 1 is configured by inserting a part of the piston rod 3 attached to an axle side into the cylinder 2 attached to a vehicle body side from a lower direction and interposing a suspension spring 27 between the cylinder 2 and the piston rod 3 as shown in FIG. 2.

The cylinder 2 includes an inner cylinder 2a and an outer cylinder 2b forming a concentric double tube. A damper case portion 4 is attached at an upper end portion of the cylinder 2. The damper case portion 4 is provided with a reservoir 30 (explained later) and the damping force generating apparatus 40. Part of the damper case portion 4 forms a vehicle-body side attaching portion 24. A cylindrical rubber bush 5 is inserted and held in the vehicle-body side attaching portion 24 in a horizontal direction (right and left direction of FIG. 2). An approximately cylindrical collar 6 is inserted and held in the horizontal direction inside the rubber bush 5. The upper end portion of the cylinder 2 is mounted to the vehicle body of the motorcycle by means of a shaft inserted into the collar 6 which is inserted and held in the vehicle-body side attaching portion 24.

An axle side mounting member 7 is screwed at a lower end portion of the piston rod 3. The axle side mounting member 7 is firmly connected to the piston rod 3 with a lock nut 8. The lower end portion of the piston rod 3 is mounted to a rear wheel supporting member of the motorcycle through a shaft inserted into a cylindrical collar 9 inserted and held in the axle side mounting member 7 in the horizontal direction (right and left direction of FIG. 2). A bump rubber 10 for preventing the shock absorber 1 bottoming out in a most compressed state is inserted into the piston rod 3 and fixed to the lower end portion of the piston rod 3 just above the axle side mounting member 7.

A guide 28a formed in a cylindrical shape is arranged inside the suspension spring 27, and a lower end portion of the guide 28a is fixed to the axle side mounting member 7 through a spring receiving member 28b. An upper end side of the guide 28a is slidably fitted to an outer side of a lower end side of the cylinder 2. When the piston rod 3 strokes with respect to the cylinder 2, a fitting length between the cylinder 2 and the guide 28a is changed.

In the embodiment, a coil 111 constituting the stroke sensor 110 is arranged inside the guide 28a. The change of the fitting length between the cylinder 2 and the guide 28a is detected as a change in the inductance of the coil 111. The stroke position of the piston rode 3 with respect to the cylinder 2 is detected in this way. The guide 28a formed in the cylindrical shape is arranged so as to surround a periphery of the piston rod 3 exposed to the outside of the cylinder 2, thereby preventing damage of the piston rod 3 caused by rock strikes and the like. An electric signal from the coil 111 is extracted via a signal line 112.

A load adjusting apparatus 28c is inserted between a lower end portion of the suspension spring 27 and the spring receiving member 28b, and a set length (spring load) of the suspension spring 27 can be adjusted by moving up and down the load adjusting apparatus 28c.

A piston 11 is connected by a nut 12 at an upper end portion of the piston rod 3 which faces the inside of an inner cylinder 2a of the cylinder 2. The piston 11 is fitted so as to slide in a vertical direction in an inner periphery of the inner cylinder 2a through a piston ring 13 held in an outer periphery of the piston 11.

A space inside the inner cylinder 2a of the cylinder 2 is sectioned into an upper piston-side oil chamber S1 and a lower rod-side oil chamber S2 by the piston 11. The piston-side oil chamber S1 and the rod-side oil chamber S2 are filled with the oil as the working fluid.

Furthermore, as shown in FIG. 2, a cap 14 is mounted to an opening in a lower surface of the outer cylinder 2b of the cylinder 2 at a portion where the piston rod 3 is inserted. A rod guide 15 through which the piston rod 3 is slidably inserted in the vertical direction in a center thereof is fitted to an inner periphery of a lower end portion of the outer cylinder 2b. A rebound rubber 16 is fitted to an inter periphery of an upper end opening of the rod guide 15. An oil seal 17 is fitted to an inner periphery of a middle portion of the rod guide 15 and a dust seal 18 is fitted to an outer periphery of a lower end portion. Leakage of oil from the cylinder 2 is prevented by sealing effect of the oil seal 17, and invasion of dust into the cylinder 2 is prevented by the sealing effect of the dust seal 18.

An oil hole 19 opening to the piston-side oil chamber S1 formed inside the inner cylinder 2a of the cylinder 2 is formed in the damper case portion 4 as shown in FIG. 2. The piston-side oil chamber S1 is communicated with a first oil chamber S3 (see FIG. 3) of the later-described damping force generating apparatus 40 through the oil hole 19. A cylindrical flow path 20 is formed between the inner cylinder 2a and the outer cylinder 2b of the cylinder 2. One end (lower end) of the flow path 20 is communicated with the rod-side oil chamber S2 through plural oil holes 21 formed in a lower end portion of the inner cylinder 2a. On the other hand, the other end (upper end) of the flow path 20 is communicated with a second oil chamber S4 (see FIG. 3) of the damping force generating apparatus 40 (explained later) through plural oil holes 22 formed at an upper end of the outer cylinder 2b and a flow path 23 formed between the damper case portion 4 and the outer cylinder 2b.

In the shock absorber 1, the damper case portion 4 attached to an upper end of the cylinder 2 includes a damper case 25 and a damper case 26, and is provided outside the cylinder 2 as shown in FIG. 3. The reservoir 30 provided inside the damper case 25 and the damping force generating apparatus 40 provided inside the damper case 26 are arranged side by side. Though the damper case 25 and the damper case 26 are integrally formed in FIG. 3, it is not limited to the example and these cases may be separated.

The reservoir 30 has a pouched bladder 32 in a space demarcated by a bottomed cylindrical concave portion 25a of the damper case 25 and a chamber cap 31 attached to an opening of the concave portion 25a as shown in FIG. 3. Here, the bladder 32 is a member formed in a pouch shape by an elastic body such as rubber, which can be inflated and deflated. An inner periphery of an opening of the bladder 32 is fitted to an outer periphery of the chamber cap 31, which is sandwiched between the outer periphery of the chamber cap 31 and an inner periphery of an opening of the damper case 25. An inside of the bladder 32 is filled with gas such as air. A space outside the bladder 32 of the reservoir 30 forms a reservoir oil chamber S5. An inside of the reservoir oil chamber S5 is filled with the oil as the working fluid.

Next, details of structure of the damping force generating apparatus 40 will be explained with reference to FIG. 3 and FIG. 4.

The damping force generating apparatus 40 includes the bottomed cylindrical damper case 26 and a case 51 one end side of which is fitted to an inner periphery of an opening at an end portion of the damper case 26 as shown in FIG. 3. A valve stopper 41, a compression-side outlet check valve 42, a valve seat member 43, an extension-side inlet check valve 44, a compression-side inlet check valve 45, a main valve member 46, an extension-side outlet check valve 47, a valve stopper 48, and a valve seat member 49 are housed sequentially in an axial direction from one end side of a concave portion 26*a* of the camper case 26 toward the other end side as well as a rod 52 and a passage member 54 are included in a center of these components. The damping force generating apparatus 40 further includes a solenoid portion 50 as an actuator inside the case 51, which is adjacent to the valve seat member 49. In the damping force generating apparatus 40 having the above structure, a valve portion 40*a* which generates a damping force and a back pressure adjusting portion 40*b* which adjusts the damping force generated by the valve portion 40*a* are formed.

First, the valve portion 40*a* will be explained.

The valve portion 40*a* includes, in the order from one end side in the axial direction shown in FIG. 4, the compression-side outlet check valve 42, the valve seat member 43, the extension-side inlet check valve 44, a first pressure chamber PS1, the compression-side inlet check valve 45, a main valve 55, the main valve member 46, a distance collar 53, the extension-side outlet check valve 47 and a second pressure chamber PS2.

The rod 52 penetrates axial centers of the valve stopper 41, the compression-side outlet check valve 42 and the valve seat member 43. The second oil chamber S4 demarcated by the valve seat member 43 is formed in an end portion on one end side inside the concave portion 26*a* of the damper case 26. The second oil chamber S4 is communicated with the rod-side oil chamber S2 (see FIG. 2) through the flow path 23, the oil holes 22, the flow path 20 and the oil holes 21 (see FIG. 2) as described above.

A concave space 43*a* the other end side of which is opened is formed in the valve seat member 43. Also in the valve seat member 43, plural oil holes 43*b* penetrating in the axial direction, plural oblique oil holes 43*c* opening to the space 43*a* and plural radial-direction oil holes 43*d* opening to the space 43*a* are formed. Here, the oil holes 43*b* are selectively opened and closed by the extension-side inlet check valve 44, and the oil holes 43*c* are selectively opened and closed by the compression-side outlet check valve 42. The compression-side outlet check valve 42 is formed by stacking plural disc valves. The oil holes 43*d* also open to a ring-shaped oil chamber S which is demarcated by the valve seat member 43, the main valve member 46 and the cylindrical distance collar 53 fitted between the valve seat member 43 and the main valve member 46 inside the concave portion 26*a* of the damper case 26. The oil chamber S is communicated with the reservoir oil chamber S5 of the reservoir 30 through a communication path 26*b* formed in the damper case 26.

Concave portions 46*a* and 46*b* having large and small different diameters are formed inside the main valve member 46 as shown in FIG. 4. Columnar passage members 54 having large and small different diameters are housed in the concave portions 46*a* and 46*b*. The main valve 55 having an approximately cylindrical shape, the other end of which protrudes to the outer peripheral side, is fitted slidably in the axial direction to an outer periphery of a large diameter portion 54*a* of the passage member 54.

An outer periphery on the other end of the main valve 55 is slidably fitted to an inner periphery of the concave portion 46*a* which is the large diameter side of the main valve member 46. Here, a ring-shaped flow path 56 is formed between an outer periphery of the main valve 55 and the inner periphery of the concave portion 46*a* of the main valve member 46 which is the large diameter side. The main valve 55 controls the oil flow generated by the sliding motion of the piston 11 inside the cylinder 2 by switching (opening and closing) the main valve 55 to thereby generate a damping force. The main valve 55 has an approximately cylindrical shape in the shock absorber 1 according to the embodiment. The main valve 55 is spaced from the valve seat member 43 to the other end side in the axial direction, or one end side in the axial direction of the main valve 55 is seated on the valve seat member 43. By such movement of the main valve 55, a gap between the main valve 55 and the valve seat member 43 is opened and closed, which allows an oil flow from a gap 59 to a gap 80. Accordingly, it is necessary, in the main valve 55, that an outer periphery of a seat portion 55*c* on one end side is positioned inside an outer periphery 55*b* on the other end side to slide on the concave portion 46*a* of the main valve member 46 so that the main valve 55 opens to the other end side in the axial direction. That is, in the main valve 55, the outer periphery on one end side in the axial direction is positioned inside the outer periphery on the other end side in the axial direction. Accordingly, a lower surface 55*d* constitutes part of a pressure receiving area with respect to a hydraulic pressure in the gap 59 as the first pressure chamber PS1, and the main valve 55 receives a valve opening pressure in the other end side in the axial direction.

In the main valve member 46, an oil hole 46*c* penetrating in the axial direction and an oblique oil hole 46*d* are formed. An oil hole 54*c* penetrating in the axial direction is formed in the large diameter portion 54*a* of the passage member 54, and an oil hole 54*d* extending in the axial direction is formed in a small-diameter portion 54*b* of the passage member 54. In the large diameter portion 54*a* of the passage member 54, an oil hole 54*e* extending from the oil hole 54*d* toward an outer side in the radial direction and opening to a later-described pilot chamber 57 is formed.

The ring-shaped first oil chamber S3 demarcated by the main valve member 46, the valve stopper 48 and the valve seat member 49 is formed in a middle portion inside the concave portion 26*a* of the damper case 26 in the axial direction.

As described above, the gap 59 is formed in the space surrounded by the distance collar 53, the valve seat member 43, the main valve member 46 and the main valve 55. In the gap 59, the extension-side inlet check valve 44 and the compression-side inlet check valve 45 are provided. The extension-side inlet check valve 44 and the compression-side inlet check valve 45 are biased in a direction closing the oil holes 43*b* of the valve seat member 43 and the oil hole 46*c* of the main valve member 46 respectively by a plate spring 60 interposed therebetween. The oil holes 43*b* of the valve member 43 constantly open to the second oil chamber S4, and the oil hole 46*c* of the main valve member 46 constantly opens to the first oil chamber S3.

The oblique oil hole 46*d* obliquely formed in the main valve member 46 is communicated with the oil hole 54*c* of the passage member 54, which is selectively opened and closed by the extension-side outlet check valve 47.

In an outer periphery side of the small diameter portion 54*b* of the passage member 54, a flow path 61 formed among the main valve member 46, the extension-side outlet check valve 47 and the valve stopper 48 extends in the axial direction. The flow path 61 is communicated with a stepped flow path 62 formed between the valve stopper 48 and the valve seat member 49.

Here, the first pressure chamber PS1 is formed of the gap 59 and the flow path 56 as shown in FIG. 4. On the other hand, the second pressure chamber PS2 includes the gap 80 formed by the valve seat member 43, the passage member 54, the main valve 55 and the rod 52, the oil holes 43c, the space 43a, the oil hole 54c, the flow path 61, the oil hole 46d, the flow path 62, an oil hole 49c, a space 74, an oil hole 77a and a space 72. The first pressure chamber PS1 is separated from the second pressure chamber PS2 by the main valve 55. The compression-side inlet check valve 45 and the extension-side inlet check valve 44 allow only inflow of the oil into the first pressure chamber PS1. The compression-side outlet check valve 42 and the extension-side outlet check valve 47 allow only outflow of the oil from the second pressure chamber PS2. The first pressure chamber PS1 and the second pressure chamber PS2 are formed in an approximately dual ring shape. In the shock absorber 1 according to the embodiment, the first pressure chamber PS1 is positioned in an outer ring side and the second pressure chamber PS2 is positioned in an inner ring side. However, the present invention is not limited to this. The first pressure chamber PS1 may be positioned in the inner ring side and the second pressure chamber PS2 may be positioned in the outer ring side in structure in which the first pressure chamber PS1 and the second pressure chamber PS2 are approximately dual ring shape. The oil hole 49c, the space 74, the oil hole 77a and the space 72 will be later described in detail.

Next, the back pressure adjusting portion 40b will be explained.

The back pressure adjusting portion 40b includes an oil hole 55a of the main valve 55, the pilot chamber 57, a plate spring 58, the passage member 54, the valve stopper 48, an oil hole 71 of the valve seat member 49 and a damping force adjusting portion 70.

The oil hole 55a is formed in the main valve 55, communicating the flow path 56 formed in the outer periphery of the main valve 55 to the pilot chamber 57. The pilot chamber 57 has a ring-shape. The pilot chamber 57 is formed by being sectioned by the main valve 55 and the large diameter portion 54a of the passage member 54 in the back side (the other end side in FIG. 4) of the main valve 55 in the large-diameter side concave portion 46a of the main valve member 46. The plate spring 58 is housed in the pilot chamber 57 and biases the main valve 55 to the valve closing side (a side in which the seat portion 55c on one end side of the main valve 55 is seated on an end surface of the valve seat member 43). The pilot chamber 57 allows an internal pressure in the valve closing direction to act on the main valve 55 by the pressure of the oil branched from the first pressure chamber PS1.

The small diameter portion 54b of the passage member 54 penetrates respective axial centers of the main valve member 46, the extension-side outlet check valve 47 and the valve stopper 48 to be fitted to a concave portion 49a of the valve seat member 49. The flow path 61 is formed on an outer peripheral side of the small diameter portion 54b of the passage member 54 as described above.

The damping force adjusting portion 70 is formed of a valve mechanism including the valve seat member 49, a spring 73, a valve body 77, a fail-safe valve 75, a spring 76 and the solenoid portion 50 as shown in FIG. 3 and FIG. 4. Here, the valve body 77 and the fail-safe valve 75 function as a damping force adjusting valve. For example, when the valve body 77 is seated on the valve seat member 49, the valve body 77 functions as the damping force adjusting valve. For example, when the valve body 77 is spaced from the valve seat member 49, the valve body 77 and the fail-safe valve 75 function as the damping force adjusting valve. In this case, the damping force is adjusted mainly by the valve body 77. For example, when the valve body 77 is spaced from the valve seat member 49 and the other end side of the valve body 77 is moved to the valve opening direction at the maximum, the fail-safe valve 75 functions as the damping force adjusting valve. In any case, the damping force adjusting valve having the valve body 77 and the fail-safe valve 75 is provided on a pilot flow path (explained later) and adjust an internal pressure of the pilot chamber 57.

The solenoid portion 50 provided in the damping force adjusting portion 70 includes a core 63, an operation rod 67, a plunger 66, a coil 65 and a core 64.

The solenoid portion 50 is formed by housing the bottomed cylindrical two cores 63, 64, the annular coil 65, the plunger 66 housed inside the cores 63, 64 and the hollow operation rod 67 penetrating an axial center of the plunger 66 and the like inside the cylindrical case 51. The operation rod 67 is supported so that its both ends in the axial direction can move in the axial direction with cylindrical guide bushes 68, 69. The valve body 77 is connected to an outer periphery in one end side of the operation rod 67 which faces an inside of a concave portion 49b of the valve seat member 49.

The valve body 77 is fitted to the concave portion 49b of the valve seat body 49 so as to move in the axial direction as shown in FIG. 4. The valve body 77 is selectively seated on a tapered valve seat 71a of the oil hole 71 formed in an axial center of the valve seat member 49, thereby opening and closing the oil hole 71. Here, the space 72 sectioned by the valve body 77 is formed in the concave portion 49b of a valve seat body 49. The spring 73 biasing the valve body 77 in the valve opening direction (the other end side of FIG. 4) is housed in the space 72. Here, the space 72 formed in the valve seat member 49 is communicated with the pilot chamber 57 through the oil hole 71 of the valve seat member 49, and the oil holes 54d and 54e of the passage member 54. The oil hole 77a is provided in the valve body 77 in a penetrating manner. The oil hole 77a constantly opens to the space 72.

On an end surface in one end side of the core 63 of the solenoid portion 50, the space 74 having a stepped concave shape is formed between the end surface and the valve seat member 49. The fail-safe valve 75 which selectively opens and closes the oil hole 77a of the valve body 77 is provided in the space 74. The fail-safe valve 75 is slidably held in the axial direction on an outer periphery of the operation rod 67, which is biased in the valve closing direction (one end side in FIG. 4) by the spring 76 housed in the space 74. An elastic modulus of the spring 76 is set to be lower than an elastic modulus of the spring 73 biasing the valve body 77 in the valve opening direction.

In the embodiment, the fail-safe valve 75 is formed of a disc valve. An elastic modulus of the fail-safe valve 75 as the disc valve is set to be higher than the elastic modulus of the spring 76 biasing the fail-safe valve 75 in the valve closing direction (one end side in FIG. 4). Therefore, when a hydraulic pressure is applied in the direction opening the fail-safe valve 75 in a normal state (except a fail state), the fail-safe valve 75 moves in the axial direction to the valve opening side against the biasing force of the spring 76, and thus the oil hole 77a is opened. In a state where the hydraulic pressure is not applied in the direction opening the fail-safe valve 75, the fail-safe valve 75 abuts on the end portion on the downstream side (the other end side in FIG. 4) of the valve body 77 by biasing the fail-safe valve 75 by the spring 76, and a backward flow of the oil is prevented by closing the oil hole 77a. That is, the fail-safe valve 75 functions as a check valve in the normal state.

For example, in the fail state where a power supply to the coil 65 of the solenoid portion 50 is interrupted and the solenoid portion 50 does not produce thrust, the valve body 77 moves in the valve opening direction to a fully open state as the elastic modulus of the spring 73 biasing the valve body 77 in the valve opening direction is higher than the elastic modulus of the spring 76 biasing the valve body 77 in the valve closing direction. Then, the spring 76 is in a flattened state, and an inner peripheral portion of the fail-safe valve 75 is sandwiched and fixed between a spring receiving seat 78 provided in one end side of the spring 76 and the valve body 77. Accordingly, as the oil hole 77a is closed by the fail-safe valve 75 in this state, reduction of the hydraulic pressure and sudden reduction of the damping force can be prevented. When the hydraulic pressure is applied in the direction opening the valve 75 in the above state, an outer peripheral portion of the fail-safe valve 75 is bent so as to be spaced from the valve body 77. As a result, the oil hole 77a is opened and the oil flows.

In the damping force generating apparatus 40 having the above structure, the oil hole 46c of the main valve member 46, the gap 59, the gap 80, the space 43a and the oil hole 43c of the valve seat member 43 configure a main oil path during the compression stroke. In the main flow path during the compression stroke, the compression-side inlet check valve 45, the main valve 55 and the compression-side outlet check valve 42 are provided. On the other hand, the oil hole 43b formed in the valve seat member 43, the gap 59, the gap 80, the oil hole 54c formed in the passage member 54 and the oil hole 46d formed in the main valve member 46 configure a main flow path during the extension stroke. In the main flow path during the extension stroke, the extension side inlet check valve 44, the main valve 55 and the extension side outlet check valve 47 are provided.

Figure 5:
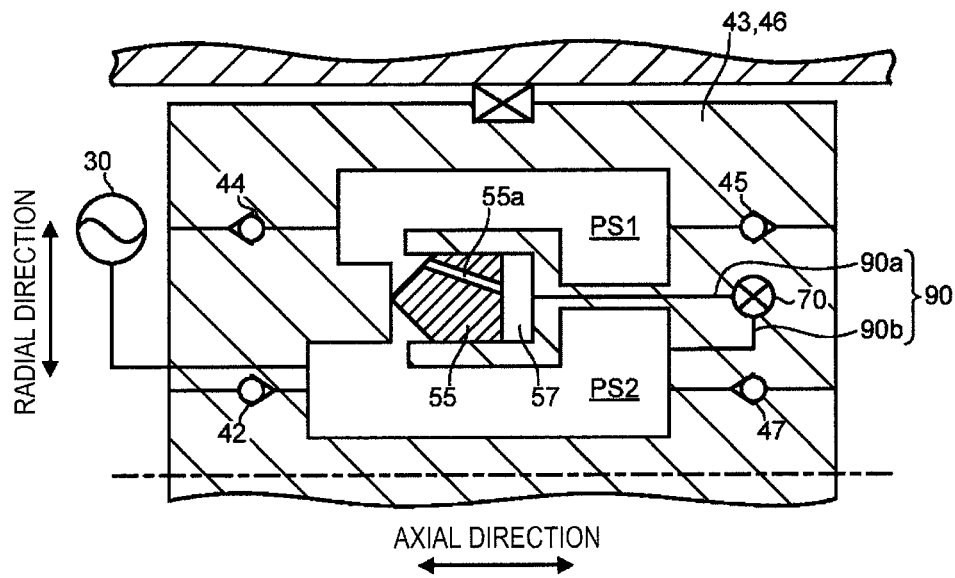
FIG. 5 is a schematic diagram showing an overview configuration of a damping force generating apparatus of the shock absorber according to the embodiment.

A pilot flow path 90 during the compression stroke includes an upstream side pilot flow path 90a and a downstream side pilot flow path 90b (see FIG. 5). The upstream side pilot flow path 90a comprises the oil hole 55a, the pilot chamber 57, the oil hole 54e, the oil hole 54d and the oil hole 71. The downstream side pilot flow path 90b comprises the space 72, the oil hole 77a, the space 74, the oil hole 49c, the flow path 62 and the flow path 61. In the fail state, the space 72 and the oil hole 77a are added to the upstream side pilot flow path 90a. Conversely, the space 72 and the oil hole 77a are subtracted from the downstream side pilot flow path 90b. When the valve body 77 is spaced from the valve seat 71a, the valve body 77 is interposed in the pilot flow path 90. A portion including the space 72, the oil hole 77a, the space 74, the oil hole 49c, the flow path 62 and the flow path 61 in the downstream side pilot flow path 90b also functions as part of the second pressure chamber PS2.

Also in the extension stroke, the pilot flow path 90 includes the upstream side pilot flow path 90a and the downstream side pilot flow path 90b in the same manner in the compression stroke (see FIG. 5). The upstream side pilot flow path 90a comprises the oil hole 55a, the pilot chamber 57, the oil hole 54e, the oil hole 54d and the oil hole 71. The downstream side pilot flow path 90b is formed by the space 72, the oil hole 77a, the space 74, the oil hole 49c, the flow path 62 and the flow path 61. In the fail state, the space 72 and the oil hole 77a are added to the upstream side pilot flow path 90a. Conversely, the space 72 and the oil hole 77a are subtracted from the downstream side pilot flow path 90b. When the valve body 77 is spaced from the valve seat 71a, the valve body 77 is interposed in the pilot flow path 90. The portion including the space 72, the oil hole 77a, the space 74, the oil hole 49c, the flow path 62 and the flow path 61 in the downstream side pilot flow path 90b also functions as part of the second pressure chamber PS2.

Here, an overview configuration of the damping force generating apparatus 40 will be explained with reference to FIG. 5 and FIG. 6.

Figure 6:
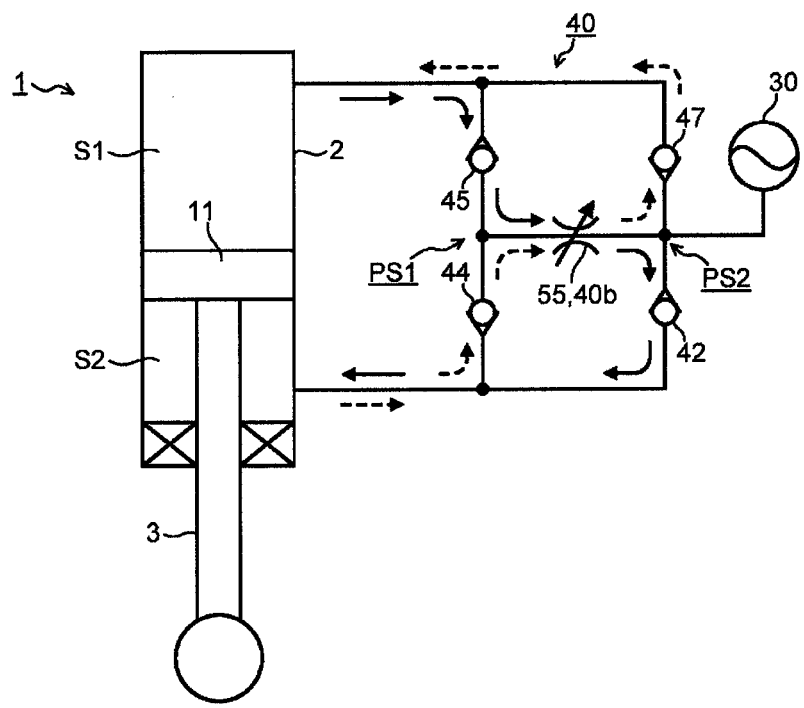
FIG. 6 is a hydraulic circuit diagram of the shock absorber according to the embodiment.

FIG. 5 is a schematic diagram showing an overview configuration of the damping force generating apparatus of the shock absorber 1, and FIG. 6 is a hydraulic circuit diagram of the shock absorber 1. In FIG. 5, the pilot flow path is denoted by 90, the upstream side pilot flow path that is a constituent of the pilot flow path 90 is denoted by 90a, and the downstream side pilot flow path that is the constituent of the pilot flow path 90 is denoted by 90b. A long dashed and short dashed line shown FIG. 5 is a center line of the damping force generating apparatus 40 in the axial direction.

As shown in FIG. 5, the annular first pressure chamber PS1 is formed at an outer peripheral side (outer ring side) of the main valve 55 as a boundary in the valve seat member 43 and the main valve member 46 in the damping force generating apparatus 40. The annular second pressure chamber PS2 is formed at an inner peripheral side (inner ring side) of the main valve 55 as a boundary and of the first pressure chamber PS1. The first pressure chamber PS1 and the second pressure chamber PS2 form an approximately dual ring shape and overlap in the radial direction.

The first pressure chamber PS1 comprises the gap 59 and the flow path 56 as described above (see FIG. 3 and FIG. 4). The second pressure chamber PS2 comprises the oil hole 43c, the space 43a, the gap 80, the oil hole 54c, the flow path 61, the oil hole 46d, the flow path 62, the oil hole 49c, the space 74, the oil hole 77a and the space 72 as described above (see FIG. 3 and FIG. 4). The compression-side inlet check valve 45 and the extension-side inlet check valve 44 allowing only the inflow of the oil into the first compression chamber PS1 in the compression stroke and the extension stroke, respectively, are connected to the first compression chamber PS1. The compression-side outlet check valve 42 and the extension side outlet check valve 47 allowing only the outflow of the oil from the second compression chamber PS2 in the compression stroke and the extension stroke, respectively, are connected to the second compression chamber PS2.

The pilot flow path 90 extending from the oil hole 55a through the pilot chamber 57 is connected to the second compression chamber PS2 as shown in FIG. 5. As described above, the downstream side pilot flow path 90b doubles as part of the second pressure chamber PS2. The damping force adjusting portion 70 is interposed in the pilot flow path 90. Then, the reservoir 30 is connected to the second pressure chamber PS2. The pilot chamber 57 is communicated with the first pressure chamber PS1 through the oil hole 55a formed in the main valve 55.

Here, a hydraulic circuit includes the main valve 55, the back pressure adjusting portion 40b, the compression-side inlet check valve 45, the compression-side outlet check valve 42, the extension-side inlet check valve 44, the extension-side outlet check valve 47 and the reservoir 30 as shown in FIG. 6. In FIG. 6, the same references are given to the same components as those described above. Here, the main valve 55, the compression-side inlet check valve 45, the compression-side outlet check valve 42, the extension-side inlet check valve 44, the extension-side outlet check valve 47, the first compression chamber PS1 and the second compression chamber PS2 are components included in the valve portion 40a. In the hydraulic circuit, the damping force generating apparatus 40 and the reservoir 30 are provided outside the piston 11, and further, outside the cylinder 2.

The reservoir 30 is communicated with an oil path branched in the downstream side of the main valve 55 and the back pressure adjusting portion 40b. As the oil path communicated with the reservoir 30 is branched in the downstream side of the main valve 55 and the back pressure adjusting portion 40b, the oil after being damped in the main valve 55 is introduced into the reservoir 30. That is, a pressure in the rod-side oil chamber S2 almost depends on only a pressure in an air chamber (a space inside the bladder 32 in FIG. 3 (not shown)) existing inside the reservoir 30, which does not vary due to a setting of a flow path resistance of the main valve 55. Therefore, a pause of the damping force occurring when turning from the compression stroke to the extension stroke can be avoided. In FIG. 6, the oil flow during the compression stroke is shown by solid lines, and the oil flow during the extension stroke is shown by dashed lines. The oil flow in the hydraulic circuit shown in FIG. 6 will be explained in explaining the operation of the shock absorber described below.

(Operation of Shock Absorber)

Figure 7:
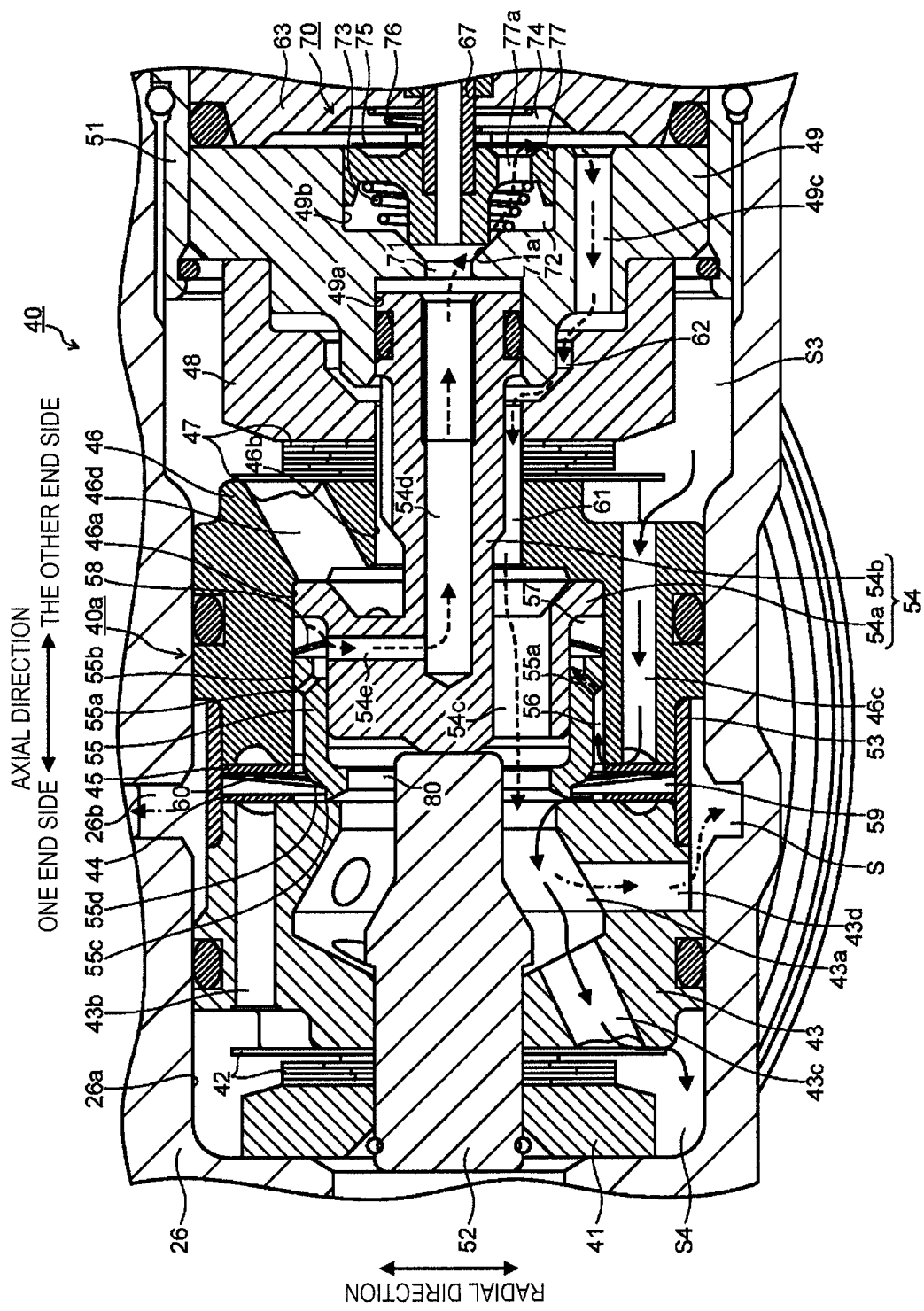
FIG. 7 is an enlarged detailed view of the portion Y of FIG. 3, which shows the oil flow during a compression stroke in the damping force generating apparatus of the shock absorber according to the embodiment.
Figure 8:
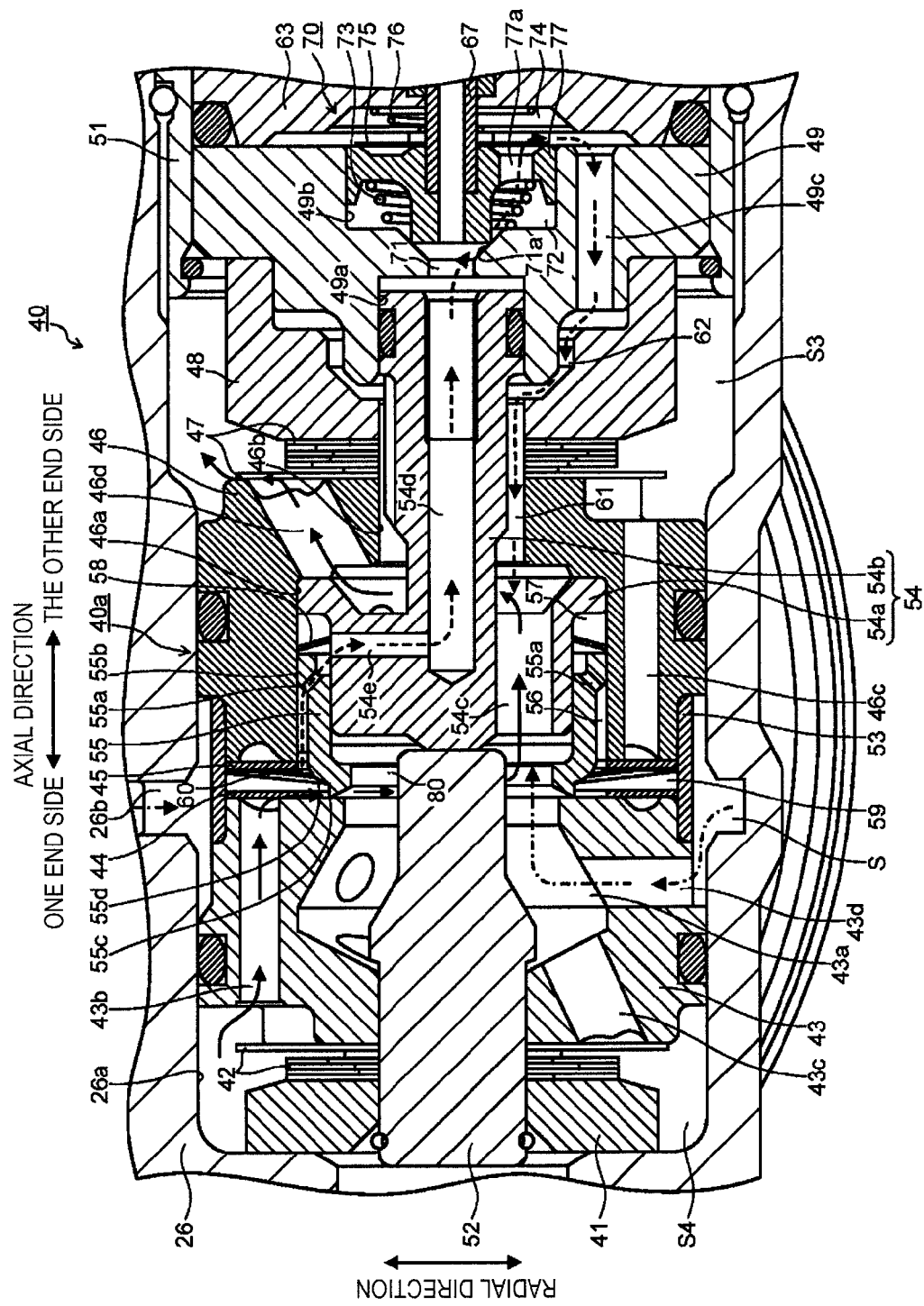
FIG. 8 is an enlarged detailed view of the portion Y of FIG. 3, which shows the oil flow during an extension stroke in the damping force generating apparatus of the shock absorber according to the embodiment.

Next, the operation of the shock absorber 1 having the above structure in the compression stroke and the extension stroke will be explained with reference to FIG. 7 and FIG. 8. FIG. 7 is an enlarged detailed view of the portion Y, which shows the oil flow during the compression stroke in the damping force generating apparatus 40 of the shock absorber 1. FIG. 8 is an enlarged detailed view of the portion Y which shows the oil flow during the extension stroke in the damping force generating apparatus 40 of the shock absorber 1.

Compression Stroke

When the rear wheel moves up and down following road surface unevenness during a travel of the motorcycle, the cylinder 2 and the piston rode 3 of the shock absorber 1 suspending the rear wheel extend and contract. In the compression stroke in which the piston rod 3 moves up relatively to the cylinder 2, the oil inside the piston-side oil chamber S1 is compressed by the piston 11, and the pressure in the piston-side oil chamber S1 is increased. Then, the oil inside the piston-side oil chamber S1 is supplied through the oil hole 19 shown in FIG. 2 to the first oil chamber S3 of the damping force generating apparatus 40 shown in FIG. 3 and FIG. 4.

The oil supplied to the first chamber S3 of the damping force generating apparatus 40 flows into the second oil chamber S4 through the main flow path in the compression stroke. Specifically, as shown by solid-line arrows in FIG. 7, the oil passes through the oil hole 46c of the main valve member 46 from the first oil chamber S3, pushing and opening the compression-side inlet check valve 45 against a biasing force of the plate spring 60 to flow into the gap 59. The oil flowing into the gap 59 pushes and opens the main valve 55 against a force in the valve closing direction by the plate spring 58 and the back pressure of the pilot chamber 57 when flowing the gap between the main valve 55 and the valve seat member 43, and flowing from the gap 59 to the gap 80 and the space 43a of the valve seat member 43.

The oil flowing into the space 43a passes through the oil hole 43c, pushing and opening the compression-side outlet check valve 42 to flow into the second oil chamber S4. The oil flowing into the second oil chamber S4 flows into the rod-side oil chamber S2 through the flow path 23, the oil hole 22 formed in the outer cylinder 2b of the cylinder 2, the flow path 20 between the inner cylinder 2a and the outer cylinder 2b and the oil hole 21 formed in the inner cylinder 2a shown in FIG. 2. At this time, the main compression-side damping force is generated in the shock absorber 1 by flow resistance of the oil passing through the main valve 55. The oil flow is shown by solid-line arrows in the hydraulic circuit shown in FIG. 6.

Part of the oil flowing into the gap 59 through the oil hole 46c of the main valve member 46 from the first oil chamber S3 joins the oil flowing in the main flow path through the compression side pilot flow path. Specifically, as shown by dashed-line arrows in FIG. 7, the part of the oil flowing into the gap 59 through the oil hole 46c of the valve member 46 from the first oil chamber S3 passes through the oil hole 55a of the main valve 55 from the flow path 56 in the outer peripheral side of the main valve 55 and flows into the pilot chamber 57.

The oil flowing into the pilot chamber 57 flows into the space 72 of the valve seat member 49 through the oil holes 54e, 54d of the passage member 54, the oil hole 71 of the valve seat member 49 and the gap between the valve body 77 and the valve seat 71a. Then, the oil flowing into the space 72 of the valve seat member 49 passes through the oil hole 77a formed in the valve body 77, pushing and opening the fail-safe valve 75 against the biasing force of the spring 76 to flow into the space 74 of the core 63. The oil flowing into the space 74 joins the oil flowing in the main flow path through the oil hole 49c of the valve seat member 49, the flow paths 62, 61 and the oil hole 54c of the passage member 54.

In this case, the fail-safe valve 75 functions as the check valve, preventing the backward flow of the oil from the space 74 to the space 72 side. The elastic modulus of the fail-safe valve 75 is set to be higher than the elastic modulus of the spring 76 as described above, therefore, the fail-safe valve 75 slides toward the other end side in the axial direction shown in FIG. 7 against the biasing force of the spring 76 without bending, and opens the oil hole 77a of the valve body 77.

The thrust produced in the solenoid portion 50 is adjusted by changing the current supplied to the coil 65 of the solenoid portion 50, and thus the pressing force to the valve seat 71a of the valve body 77 is controlled, thereby changing an opening degree of the valve body 77 (valve opening pressure of the valve body 77). In this way, the opening degree of the valve body 77 is adjusted by changing the current supplied to the coil 65 of the solenoid portion 50 as described above, thereby adjusting the flow resistance of the oil passing through the gap between the valve body 77 and the valve seat 71a. Accordingly, an internal pressure of the upstream-side pilot flow path extending from the oil hole 55a to the oil hole 71 can be adjusted. The internal pressure (back pressure) of the pilot chamber 57 can also be adjusted by an adjustment of the internal pressure of the upstream-side pilot flow path. As a result, the opening degree of the main valve 55 can be adjusted by controlling the force pressing the main valve 55 in the valve closing direction by the internal pressure (back pressure) of the pilot chamber 57. The opening degree of the main valve 55 is adjusted as described above, thereby adjusting the compression-side damping force generated by the flow resistance of the oil passing through the main valve 55. That is, the valve body 77 functions as the damping force adjusting valve in the normal state.

Specifically, when the current supplied to the coil 65 is low, the pressing force applied to the valve body 77 by the thrust of the solenoid portion 50 toward the valve seat 71a is low, and the valve opening pressure of the valve body 77 is also low. Accordingly, the opening degree of the valve body 77 is increased, and the flow resistance of the oil flowing in the valve body 77 is reduced. Therefore the internal pressure of the pilot chamber 57 (pressure to the main valve 55 in the valve closing direction) is also reduced. As a result, the opening degree of the main valve 55 is increased, and the flow resistance of the oil flowing in the main valve 55 is reduced. Therefore, the compression-side damping force generated by the flow resistance is also reduced.

Conversely, when the current supplied to the coil 65 is high, the pressing force applied to the valve body 77 by the thrust of the solenoid portion 50 toward the valve seat 71a is high, and the valve opening pressure of the valve body 77 is also high. Accordingly, the opening degree of the valve body 77 is reduced, and the oil flowing in the valve body 77 is reduced. Therefore the flow resistance is increased, and the internal pressure of the pilot chamber 57 is increased. As a result, the opening degree of the main valve 55 is reduced, and the flow resistance of the oil flowing in the main valve 55 is increased. Therefore the compression-side damping force generated by the flow resistance is also increased.

In the compression stroke, an amount of oil corresponding to a volume of the piston rod 3 entering into the inner cylinder 2a of the cylinder 2 flows into the oil chamber S through the oil hole 43d of the valve seat member 43 as shown by chain-line arrows in FIG. 7. The oil flowing into the oil chamber S is supplied to the reservoir oil chamber S5 (see FIG. 3) of the reservoir 30 through the communication path 26b. Accordingly, the bladder 32 of the reservoir 30 contracts, and the gas inside the bladder 32 is compressed. Due to the compression of the gas, a capacity change inside the inner cylinder 2a occurred by means of the piston rod 3 entering into the inner cylinder 2a of the cylinder 2 is compensated.

Extension Stroke

Next, the operation during the extension stroke of the shock absorber 1 will be explained with reference to FIG. 8.

In the extension stroke in which the piston rod 3 moves downward relatively to the cylinder 2, the piston 11 moves downward inside the inner cylinder 2a of the cylinder 2 with the piston rod 3. Accordingly, the oil inside the rod-side oil chamber S2 is compressed by the piston 11, and the oil pressure is increased. Then, the oil inside the rod-side oil chamber S2 is supplied to the second oil chamber S4 of the damping force generating apparatus 40 shown in FIG. 3 and FIG. 4 through the oil hole 21 formed in the inner cylinder 2a, the flow path 20 between the inner cylinder 2a and the outer cylinder 2b, the oil hole 22 formed in the outer cylinder 2b and the flow path 23 which are shown in FIG. 2.

The oil supplied to the second oil chamber S4 of the damping force generating apparatus 40 flows into the first oil chamber S3 through the main flow path during the extension stroke. Specifically, the oil passes through the oil hole 43b of the valve seat member 43 from the second oil chamber S4, pushing and opening the extension-side inlet check valve 44 against the biasing force of the plate spring 60 to flow into the gap 59 as shown by solid-line arrows in FIG. 8. The oil flowing into the gap 59 pushes and opens the main valve 55 against the force in the valve closing direction by the plate spring 58 and the back pressure of the pilot chamber 57, passes through the gap 80, the oil hole 54c of the passage member 54, and the oil hole 46d of the main valve member 46 from the gap 59, and pushes and opens the extension-side outlet check valve 47 to flow into the first oil chamber S3.

Then, the oil flowing into the first oil chamber S3 flows into the piston-side oil chamber S1 through the oil hole 19 shown in FIG. 2 from the first oil chamber S3. At this time, the extension damping force is generated in the shock absorber 1 by the flow resistance of the oil passing through the main valve 55. The oil flow at this time is shown by dashed-line arrows in the hydraulic circuit shown in FIG. 6.

Part of the oil flowing into the gap 59 through the oil hole 43b of the valve seat member 43 from the second oil chamber S4 joins the oil flowing in the main flow path through the extension side pilot flow path from the flow path 56. Specifically, part of the oil flowing into the gap 59 through the oil hole 43b of the valve seat member 43 from the second oil chamber S4 flows into the pilot chamber 57 through the oil hole 55a of the main valve 55 from the flow path 56 on the outer peripheral side of the main vale 55 as shown by dashed-line arrows in FIG. 8.

The oil flowing into the pilot chamber 57 passes through the oil holes 54e, 54d of the passage member 54, the oil hole 71 of the valve seat member 49 and the gap between the valve body 77 and the valve seat 71a to flow into the space 72 of the valve seat member 49. Then, the oil flowing into the space 72 of the valve seat member 49 passes through the oil hole 77a formed in the valve body 77, pushing and opening the fail-safe valve 75 against the biasing force of the spring 76 to flow into the space 74 of the core 63. The oil flowing into the space 74 joins the oil flowing in the main flow path through the oil hole 49c of the valve seat member 49, the flow paths 62, 61 and the oil hole 54c of the passage member 54.

In this case, the fail-safe valve 75 functions as the check valve to prevent the backward flow of the oil from the space 74 to the space 72 side. As described above, the elastic modulus of the fail-safe valve 75 is set to be higher than the elastic modulus of the spring 76. Therefore the fail-safe valve 75 slides toward the other end side in the axial direction shown in FIG. 8 against the biasing force of the spring 76 without bending, and opens the oil hole 77a of the valve body 77.

Here, the thrust produced in the solenoid portion 50 is adjusted by changing the current supplied to the coil 65 of the solenoid portion 50, and thus the pressing force to the valve seat 71a of the valve body 77 is controlled, thereby changing the opening degree of the valve body 77 (valve opening pressure of the valve body 77). In this way, the opening degree of the valve body 77 is adjusted by changing the current supplied to the coil 65 of the solenoid portion 50 as described above, thereby adjusting the flow resistance of the oil passing through the gap between the valve body 77 and the valve seat 71a. Accordingly, the internal pressure of the upstream-side pilot flow path extending from the oil hole 55a to the oil hole 71 can be adjusted. The internal pressure (back pressure) of the pilot chamber 57 can also be adjusted by the adjustment of the internal pressure of the upstream-side pilot flow path. As a result, the opening degree of the main valve 55 can be adjusted by controlling the force pressing the main valve 55 in the valve closing direction by the internal pressure (back pressure) of the pilot chamber 57. The opening of the main valve 55 is adjusted as described above, thereby adjusting the extension-side damping force generated by the flow resistance of the oil passing through the main valve 55. That is, the valve body 77 functions as the damping force adjusting valve in the normal state.

Specifically, when the current supplied to the coil 65 is low, the pressing force applied to the valve body 77 by the thrust of the solenoid portion 50 toward the valve seat 71a is low, and the valve opening pressure of the valve body 77 is also low. Accordingly, the opening degree of the valve body 77 is increased, and the flow resistance of the oil flowing in the valve body 77 is reduced. Therefore the internal pressure of the pilot chamber 57 (pressure to the main valve 55 in the valve closing direction) is also reduced. As a result, the opening degree of the main valve 55 is increased, and the flow resistance of the oil flowing in the main valve 55 is reduced. Therefore the extension-side damping force generated by the flow resistance is also reduced.

Conversely, when the current supplied to the coil 65 is high, the pressing force applied to the valve body 77 by the thrust of the solenoid portion 50 toward the valve seat 71a is high, and the valve opening pressure of the valve body 77 is also high. Accordingly, the opening degree of the valve body 77 is reduced, the oil flowing in the valve body 77 is reduced, the flow resistance is increased, and the internal pressure of the pilot chamber 57 is increased. As a result, the opening degree of the main valve 55 is reduced, and the flow resistance of the oil flowing in the main valve 55 is increased, as a result, the extension-side damping force generated by the flow resistance is also increased.

In the extension stroke, an amount of oil corresponding to the volume of the piston rod 3 coming out from the inner cylinder 2a of the cylinder 2 flows into the oil chamber S from the reservoir oil chamber S5 of the reservoir 30 through the communication path 26b as shown by chain-line arrows in FIG. 8. The oil flowing into the oil chamber S flows into the gap 80 through the oil hole 43d and the space 43a of the valve seat member 43 and joins the oil flowing in the main flow path in the gap 80. The oil joining the oil flowing in the main flow path passes through the oil hole 54c of the communication member 54 and the oil hole 46d of the main valve member 46, pushing and opening the extension-side outlet check valve 47 to flow into the first oil chamber S3. Then, the oil flowing into the first oil chamber S3 is supplied to the piston-side oil chamber S1 through the oil hole 19 shown in FIG. 2. Accordingly, the bladder 32 of the reservoir 30 expands and the gas inside the bladder 32 is expanded. Due to expansion of the gas, the capacity change inside the inner cylinder 2a occurred by means of the piston rod 3 coming out from the inner cylinder 2a of the cylinder 2 is compensated.

Next, control of the damping force generating apparatus 40 in the shock absorber 1 by the controller 101 in the vehicle suspension system 100 according to the embodiment will be explained. The controller 101 comprises a computer 102 or the likes, which is embodied as, for example, an in-vehicle ECU or the like. In the embodiment, the controller 101 controls the extension side damping force and the compression side damping force generated by the damping force generating apparatus 40 so as to be a value in proportion to the stroke position based on a detection signal of the stroke sensor 110. Specifically, a current value to be supplied to the solenoid portion 50 of the damping force generating apparatus 40 in accordance with the stroke position detected by the stroke sensor 110, and then the extension side damping force and the compression side damping force are controlled so that the current with the calculated current value is supplied to the solenoid portion 50.

Figure 9:
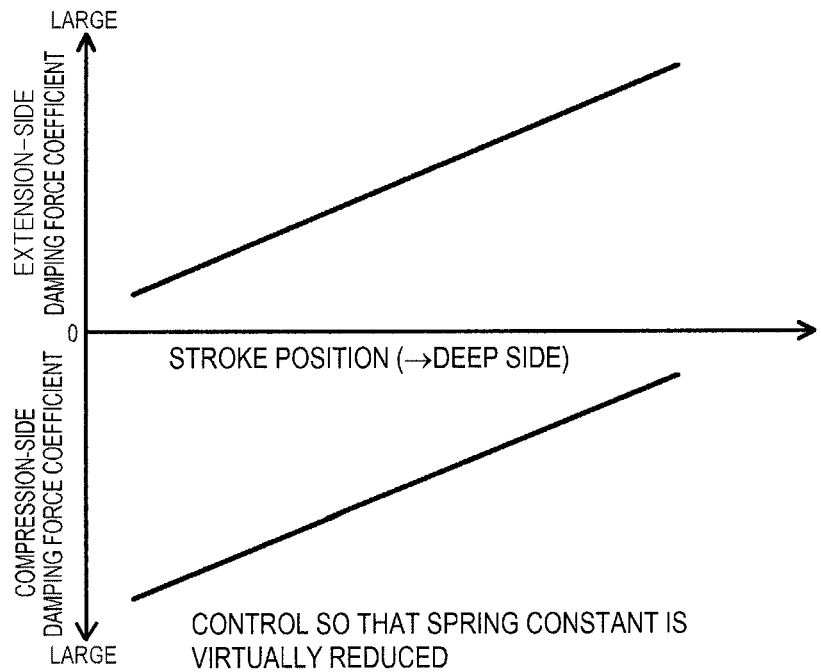
FIG. 9 is a graph showing the relation between the stroke position and the extension-side/compression-side damping force coefficients.

In this case, for example, as shown in a graph in FIG. 9 in which a vertical axis indicates the extension-side damping force coefficient and the compression-side damping force coefficient, and a horizontal axis indicates a stroke position, the controller 101 controls the damping force generating apparatus 40 so that a value of the extension-side damping force coefficient in the shock absorber 1 is increased in proportion to the stroke position as well as a value of the compression-side damping force coefficient is reduced in proportion to the stroke position. Accordingly, the damping force generating apparatus 40 is controlled so that a spring constant in the vehicle suspension system 100 is virtually reduced. That is, when the spring constant is "k" and displacement is "x", a force F acting by the spring such as the suspension spring 27 is represented by the following formula:

$$F = -kx$$

When the spring constant is "k" and mass is "m", a resonant frequency f is represented by the following formula:

$$f = (1/2\pi)(k/m)^{1/2}$$

As indicated above, the resonant frequency is determined by the spring constant and the mass in the suspension, and the resonance frequency affects the riding comfortability. Accordingly, the resonant frequency can be shifted by the control, for example, so that the spring constant is virtually reduced as in the embodiment, and thus occurrence of resonance can be suppressed.

Figure 10:
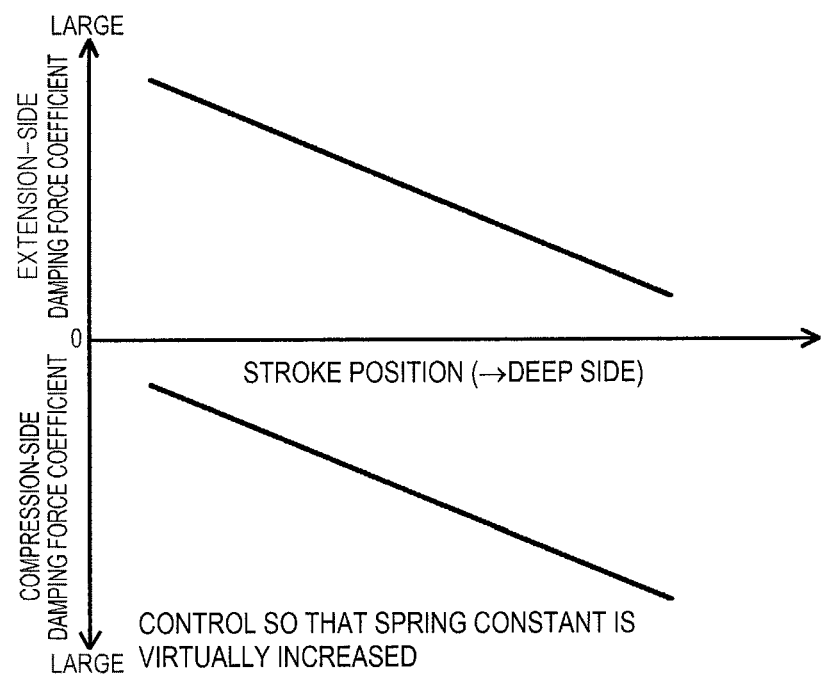
FIG. 10 is a graph showing the relation between the stroke position and the extension-side/compression-side damping force coefficients.

For example, as shown in a graph in FIG. 10 in which the vertical axis indicates the extension-side damping force coefficient and the compression-side damping force coefficient, and the horizontal axis indicates the stroke position, the controller 101 controls the damping force generating apparatus 40 so that the value of the extension-side damping force coefficient in the shock absorber 1 is reduced in proportion to the stroke position as well as the value of the compression-side damping force coefficient is increased in proportion to the stroke position. Accordingly, the damping force generating apparatus 40 is controlled so that the spring constant in the vehicle suspension system 100 is virtually increased. Also in this case, the resonance frequency can be shifted and the occurrence of resonance can be suppressed.

Note that a piston velocity Vp can also be calculated by the controller 101 based on temporal variation of the detection signal of the stroke position transmitted from the stroke sensor 110. The control by the controller 101 can be performed by combining the control of the damping force by various algorithms with the control of the virtual spring constant.

As described above, with the vehicle suspension system 100 according to the embodiment, not only the damping force but also the spring constant is virtually controlled in the vehicle suspension system using the semi-active damper. According to the system, freedom in control can be increased as compared with related art without incurring additional manufacturing costs, complication of the mechanism and increase of power consumption.

Furthermore, in the vehicle suspension system 100 according to the embodiment, the damping force generating apparatus 40 has the structure in which the first pressure chamber PS1 and the second pressure chamber PS2 overlap each other in the radial direction in the approximately dual ring shape as shown in FIG. 5, which can realize a compact space.

The above embodiment shows an example in which the present invention is applied to the inverted shock absorber having the cylinder mounted on a vehicle body side and the piston rod mounted on an axle side. The present invention can also be applied to an upright shock absorber having a piston rod mounted on the vehicle body side and a cylinder mounted on the axle side. The present invention can further be applied to a shock absorber used as a front fork of a motorcycle having a damping force generating apparatus at an outside of a cylinder as well as a shock absorber used as a front fork having a damping force generating apparatus incorporated in a piston in a compact manner.

Also the above embodiment shows the example in which the present invention is applied to a shock absorber used as a rear cushion suspending a rear wheel of a motorcycle with respect to a vehicle body. It is naturally possible to apply the present invention to a shock absorber suspending a wheel of any vehicles other than the motorcycle.

Some embodiments of the present invention have been explained. These embodiments have been provided as examples and are not intended to limit scope of the invention. These novel embodiments can be executed in other various forms and various omission, replacements and alternations may occur in scope not departing from a gist of the invention. These embodiments and modifications thereof are included in the scope and the gist of the invention and included in the inventions described in claims and equivalents thereof.

What is claimed is:

1. A vehicle suspension system comprising:
   a shock absorber including a cylinder in which a fluid is sealed, a piston slidably fitted into the cylinder, a piston rod connected to the piston and extending to an outside of the cylinder, and a damping force generating apparatus controlling a flow of the fluid generated by a sliding motion of the piston inside the cylinder;
   a suspension spring;
   a detector detecting a stroke position of the piston rod with respect to the cylinder; and
   a controller, which comprises a computer and is configured to control the damping force generating apparatus, wherein
   the computer is configured to increase an extension side damping force coefficient in proportion to the stroke position, while decreasing a compression side damping force coefficient in proportion to the stroke position so that a virtually reduced spring constant is provided in the suspension system, or
   the computer is configured to decrease an extension side damping force coefficient in proportion to the stroke position, while increasing a compression side damping force coefficient in proportion to the stroke position so that a virtually increased spring constant is provided in the suspension system, and
   the damping force generating apparatus includes;
     a main valve generating a damping force by controlling the flow of the fluid generated by the sliding motion of the piston inside the cylinder by a switching operation of the main valve,
     a first pressure chamber and a second pressure chamber separated from each other by the main valve,
     a compression-side inlet check valve and an extension-side inlet check valve allowing only an inflow of the fluid into the first pressure chamber, and
     a compression-side outlet check valve and an extension-side outlet check valve allowing only an outflow of the fluid from the second pressure chamber.

2. The vehicle suspension system according to claim 1, wherein the controller controls the damping force generating apparatus so that the extension side damping force is increased in proportion to the stroke position and the compression side damping force is reduced in proportion to the stroke position.

3. The vehicle suspension system according to claim 1, wherein the controller controls the damping force generating apparatus so that the extension side damping force is reduced in proportion to the stroke position and the compression side damping force is increased in proportion to the stroke position.

4. The vehicle suspension system according to claim 1, wherein the controller calculates a stroke velocity based on temporal variation of the stroke position detected by the detector.

5. The vehicle suspension system according to claim 1, wherein the controller controls the damping force generating apparatus as if a spring constant of the suspension spring is changed.

6. The vehicle suspension system according to claim 1, wherein the first pressure chamber and the second pressure chamber are formed in an approximately dual ring shape.

* * * * *